United States Patent
Anderson et al.

(10) Patent No.: US 6,219,042 B1
(45) Date of Patent: *Apr. 17, 2001

(54) SELECTIVE REESTABLISHMENT OF INTERNET CONNECTIVITY BASED ON DURATION OF USER INACTIVITY

(75) Inventors: David R. Anderson, Saratoga; Christopher M. White, San Francisco, both of CA (US)

(73) Assignee: WebTV Networks, Inc., Mountain View, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/153,574

(22) Filed: Sep. 15, 1998

(51) Int. Cl.[7] .............................. G06F 15/00; H04N 11/00
(52) U.S. Cl. .......................... 345/327; 348/552; 348/564; 725/51; 725/109; 725/133; 725/141; 725/153
(58) Field of Search ................................... 345/327, 328; 348/10, 12, 552, 553, 564, 565; 725/39, 42, 51, 52, 56, 60, 61, 87, 106, 109, 110, 112, 133, 141, 153

(56) References Cited

U.S. PATENT DOCUMENTS

| | | | | |
|---|---|---|---|---|
| 5,790,201 | * | 8/1998 | Antos ................................. | 348/552 |
| 5,818,935 | * | 10/1998 | Maa .................................... | 348/467 |
| 5,940,073 | * | 8/1999 | Klosterman et al. ................ | 345/327 |
| 5,945,991 | * | 8/1999 | Britt et al. .......................... | 345/333 |
| 5,977,963 | * | 11/1999 | Gaughan et al. .................... | 345/327 |
| 5,982,363 | * | 11/1999 | Naiff .................................. | 345/327 |

* cited by examiner

Primary Examiner—Ba Huynh
(74) Attorney, Agent, or Firm—Workman, Nydegger & Seeley (57) ABSTRACT

An Internet access terminal automatically manages telephone communication with an Internet service provider to reduce inactive telephone line usage when the user toggles from the Internet mode to the television mode. A user who has been browsing the Internet can toggle the terminal to the television mode from the Internet mode, which has a particular state relating to the Internet page that is being viewed. The terminal saves state information representing the Internet state and monitors the time that elapses after the terminal is toggled. If a first period of time elapses, the telephone connection is dropped. If a longer, second period of time also elapses, the state information is discarded. Upon toggling back to the Internet mode, communication is resumed using the telephone connection and the Internet state is restored if the first period has not elapsed. If the first period has elapsed and the second period has not elapsed, the terminal automatically reestablishes communication by telephone and restores the Internet state. If the first and second periods have elapsed, the terminal automatically reestablishes communication and selects a default Internet state.

9 Claims, 6 Drawing Sheets

SELECTIVE REESTABLISHMENT OF INTERNET CONNECTIVITY BASED ON DURATION OF USER INACTIVITY

FIELD OF THE INVENTION

The present invention relates to Internet browsing and television viewing. More particularly, the invention relates to a system for integrating television viewing and Internet browsing.

BACKGROUND OF THE INVENTION

The advent of the Internet and the growth of resources accessible on the Internet have led to an increase in demand among the general public for access to the Internet. For some individuals and families, the cost of a general purpose computer has been a major impediment to obtaining access to the Internet. One solution for such people has been the recent development of low cost, special purpose Internet access devices, such as the WEBTV Internet access terminal, which utilizes a standard television set as a display. (WEBTV is a registered trademark of WEBTV Networks, Inc. of Mountain View, Calif.) Such devices allow users to access the Internet without making the substantial investment required to purchase a personal computer.

Internet browsing and television viewing are further becoming linked in ways beyond the use of a television as a display device. In particular, various systems have been developed to deliver uniform resource locators ("URL's") in the broadcast television signal to direct viewers to Internet content associated with particular television shows or advertisers. Similarly, the INTERCAST® system from INTEL® embeds actual digital information from Internet sites for downloading simultaneously with the video content. Thus, it can be seen that the trend is for Internet browsing and television viewing to become more closely linked.

One unfortunate consequence of the increasing integration of television viewing and Internet browsing, particularly when using a single display, is the corresponding increase in complexity of the user interface necessary to allow users to access the features available to support television viewing and Internet browsing and switching therebetween. Prior user interface designs have allowed users to switch between an Internet browsing mode and a television viewing mode without regard for the recent status of either mode. Within each of these modes, there may be many different configurations in addition to basic browsing or viewing. These auxiliary configurations may be set-up screens, programming guides or other screens on which web content or television programming is not displayed. Thus, in attempting to return to television viewing, users may be confronted with an auxiliary screen in which television is not displayed and may become confused or frustrated attempting to obtain a television program display.

SUMMARY OF THE INVENTION

The present invention includes a method of interspersing Internet browsing and television viewing where a user is provided with a user interface having an Internet mode adapted for Internet browsing and a television mode adapted for television viewing. The television mode includes a plurality of configurations and the user interface is adapted to toggle between the modes responsive to user input. The user interface is placed in the television mode in a first configuration and toggled to the Internet mode responsive to user input. Upon returning the user interface to the television mode, the configuration of the television mode is selectively changed to a second configuration different than the first configuration.

The present invention also includes a system for integrating Internet browsing and television viewing. The system including a user interface display with an Internet mode adapted for Internet browsing and a television mode adapted for television viewing. The television mode has a plurality of configurations, including at least one viewing configuration in which television programming is displayed on the user interface display and at least one auxiliary configuration in which no television programming is displayed on the user interface display. A control system associated with the user interface display controls the mode and configuration of the user interface display. The control system toggles the user interface display between Internet and television modes responsive to user input and is configured to place the user interface display in the viewing configuration of the television mode upon toggling from the Internet mode to the television mode after having toggled from the auxiliary configuration of the television mode to the Internet mode.

DETAILED DESCRIPTION OF THE INVENTION

Figure 1:
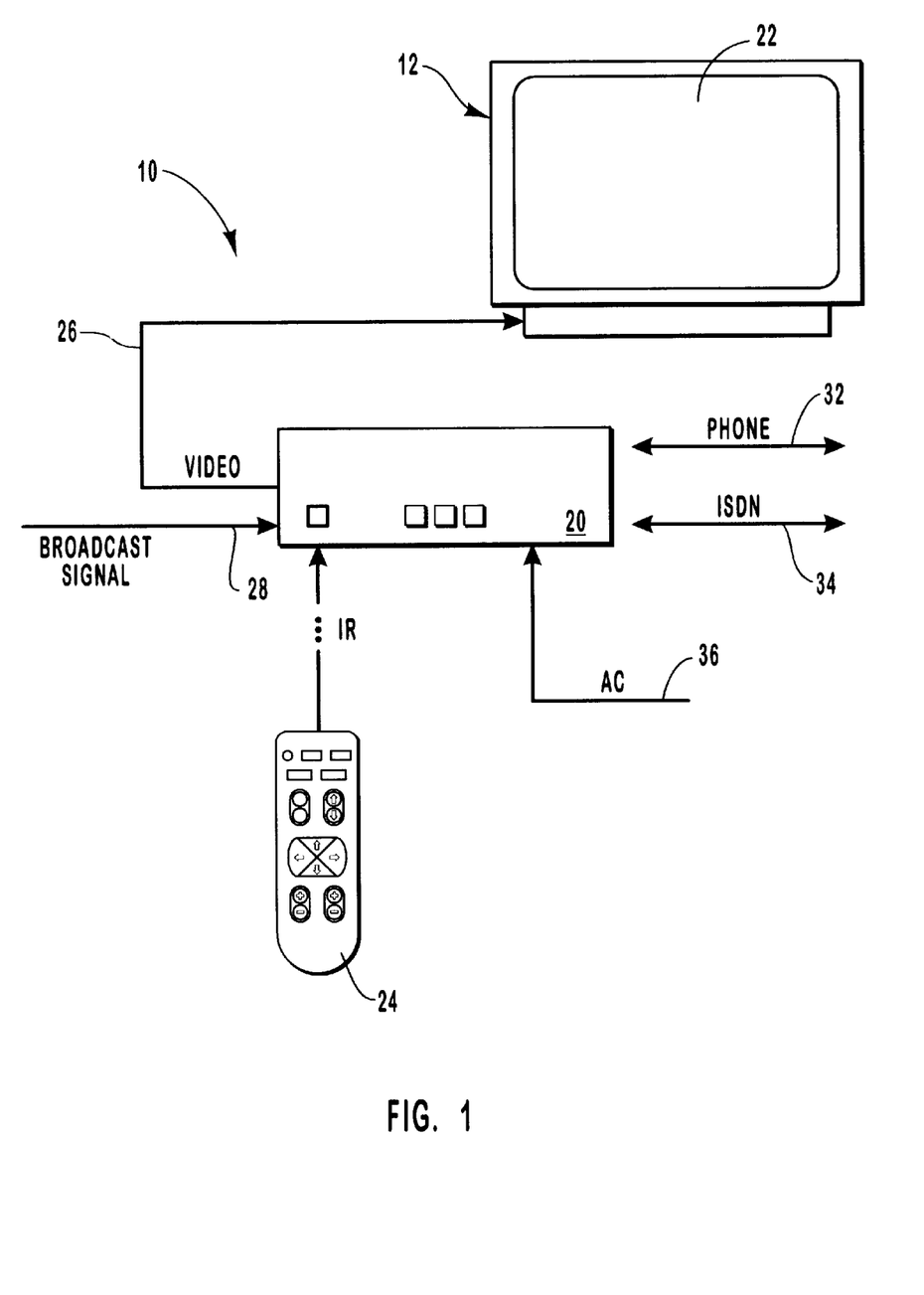
FIG. 1 is a schematic view of an Internet access terminal according to the present invention.
Figure 2:
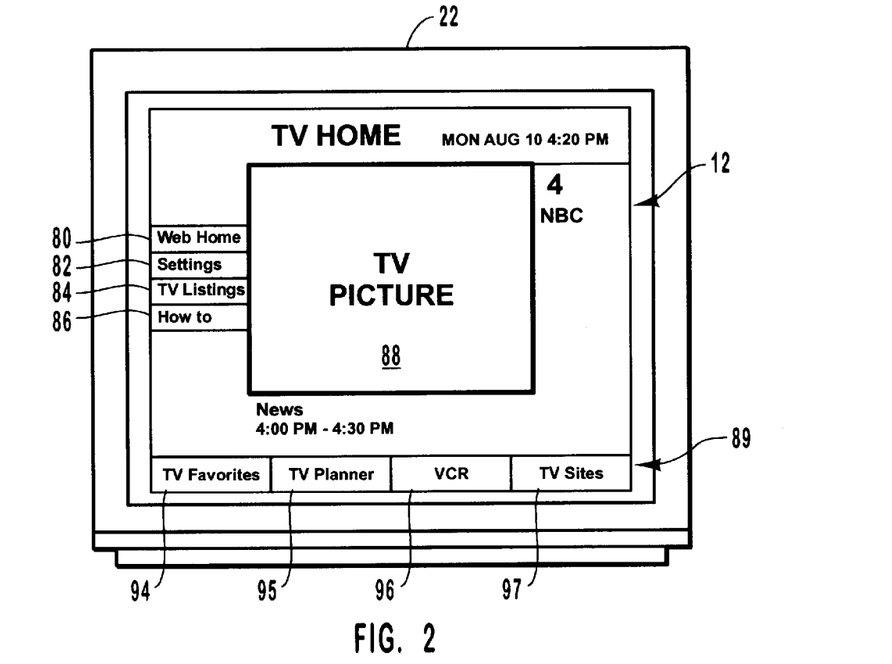
FIG. 2 shows a user interface in a home configuration of a television viewing mode.
Figure 3:
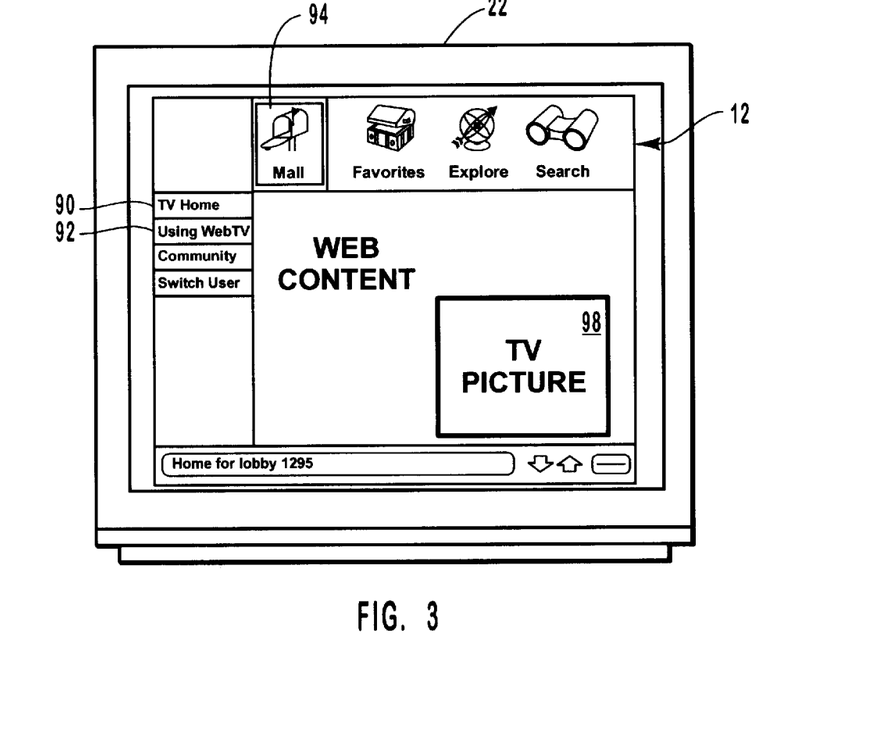
FIG. 3 shows the user interface of FIG. 2 in a home configuration of an Internet browsing mode.

An Internet access terminal according to the present invention is shown generally at 10 in FIG. 1. Terminal 10 includes a user interface 12 which has a television viewing mode and an Internet browsing mode, as depicted in FIGS. 2 and 3, respectively. Each mode includes various user interface configurations, hereinafter configurations, associated with television viewing or Internet browsing, including the television home and Internet home configurations shown in FIGS. 2 and 3. As described in more detail below, the present invention includes a system for facilitating transitions between the Internet browsing and television viewing modes.

In the disclosed embodiment, terminal 10 is preferably, but not necessarily, a WEBTV Internet terminal. As shown in FIG. 1, the terminal includes a control system in the form of electronics unit 20 (hereinafter referred to as "the set-top box" 20 because it is often positioned on the top of a television set). Terminal 10 also includes a display in the form of a television set 22 connected to set-top box 20. It should be understood that any display device capable of displaying graphical images, such as a computer monitor, could be used in place of television 22. Alternatively, set-top box 20 may be built into television set 22 as an integral unit. A remote control 24 is operated by the user to operate the terminal. Although depicted as similar to a remote control for a television, remote control 24 also could include a standard keyboard to allow a user greater input capabilities. The set-top box receives commands from remote control 24 via an infrared (IR) communication link. Alternatively, the link between the remote control and the set-top box may be radio frequency (RF), or any equivalent mode of communication (e.g., wires, etc.).

The terminal uses television set 22 as a display device for displaying the user interface. The set-top box is coupled to the television set by a video link 26. The video link is an RF, S-video, composite video or other equivalent form of video link.

The set-top box includes hardware and/or software for receiving and decoding a broadcast video signal 28, such as an NTSC, PAL, SECAM or other TV system video signal. Set-top box 20 also includes hardware and/or software to create the user interface to be displayed on television 22, by which the user can access various Internet system network services, browse the Web, send email, and otherwise access the Internet and control television viewing.

Terminal 10 may include both a standard modem and an ISDN modem (see FIG. 4), such that the communication link between set-top box 20 and the Internet can be either a telephone connection 32 or an ISDN (Integrated Services Digital Network) connection 34. Note that the set-top box also may include a cable television or radio frequency modem, or other communications device (not shown). The set-top box receives power through a power line 36.

Figure 4:
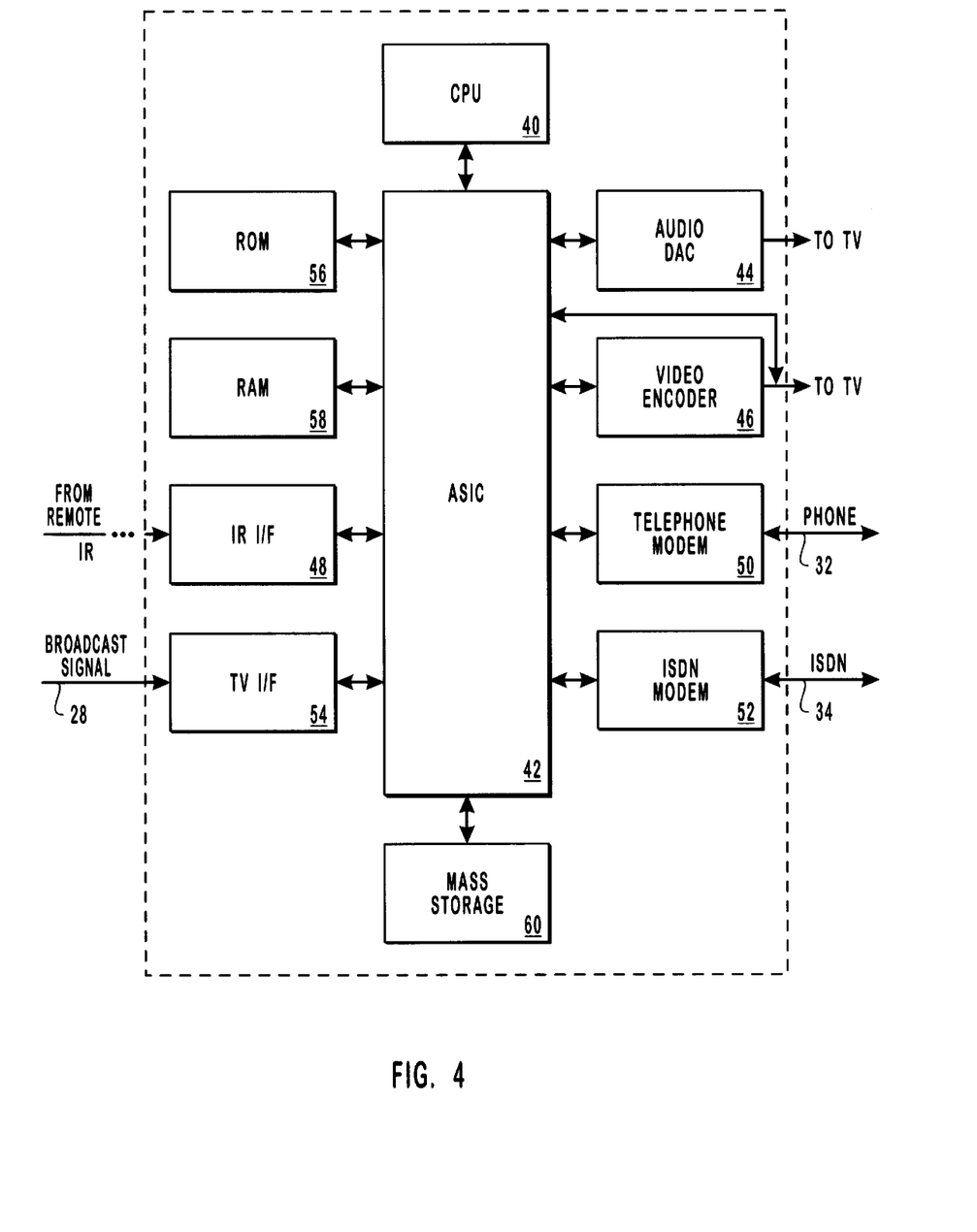
FIG. 4 is a schematic view illustrating the architecture of the terminal of FIG. 1.

FIG. 4 is a block diagram illustrating internal features of set-top box 20. In this example, operation of the terminal is controlled by a processing unit, such as central processing unit (CPU) 40, which is coupled to an Application-Specific Integrated Circuit (ASIC) 42. The CPU executes software designed to implement various capabilities and features of the set-top box. ASIC 42 contains circuitry which may be used to implement some features as well. ASIC 42 is coupled to an audio digital-to-analog converter (DAC) 44 which provides audio output to television set 22. In addition, ASIC 42 is coupled to a video encoder 46 which provides video output to television set 22. An IR interface 48 detects IR signals transmitted by remote control 24 and, in response, provides corresponding electrical signals to ASIC 42. A standard telephone modem 50 and an ISDN modem 52 are coupled to ASIC 42 to provide Internet connections 32 and 34, respectively.

A TV interface 54 is coupled to ASIC 42 to receive video signals, such as an NTSC video signal, and provide corresponding electrical signals to ASIC 42, thereby allowing video data carried in video signal 28 to be presented to the viewer on television set 22. More specifically, TV interface 54 is configured to digitize the incoming video signal, which is stored in RAM 58, so that ASIC 42 and CPU 40 can process the video signal before displaying it on the television set. The configuration enables the set-top box, for instance, to generate shared screen viewing where the video signal only occupies a portion of the screen. The remaining screen area thus can be used to display various user interface controls or data, such as video programming information.

Also coupled to ASIC 42 is read-only memory (ROM) 56, which provides for storage of program code for implementing application software to be executed by the set-top box. Note that ROM 56 may be a programmable ROM (PROM), or any form of erasable PROM (EPROM), or flash memory. A mass storage device 60 optionally may be provided and coupled to ASIC 42. The mass storage device may be used to input software or data to the terminal, or to store downloaded software or data. Mass storage device 60 can be any suitable medium for storing machine-executable instructions, such as magnetic disks, optical disks, or the like.

Figure 5:
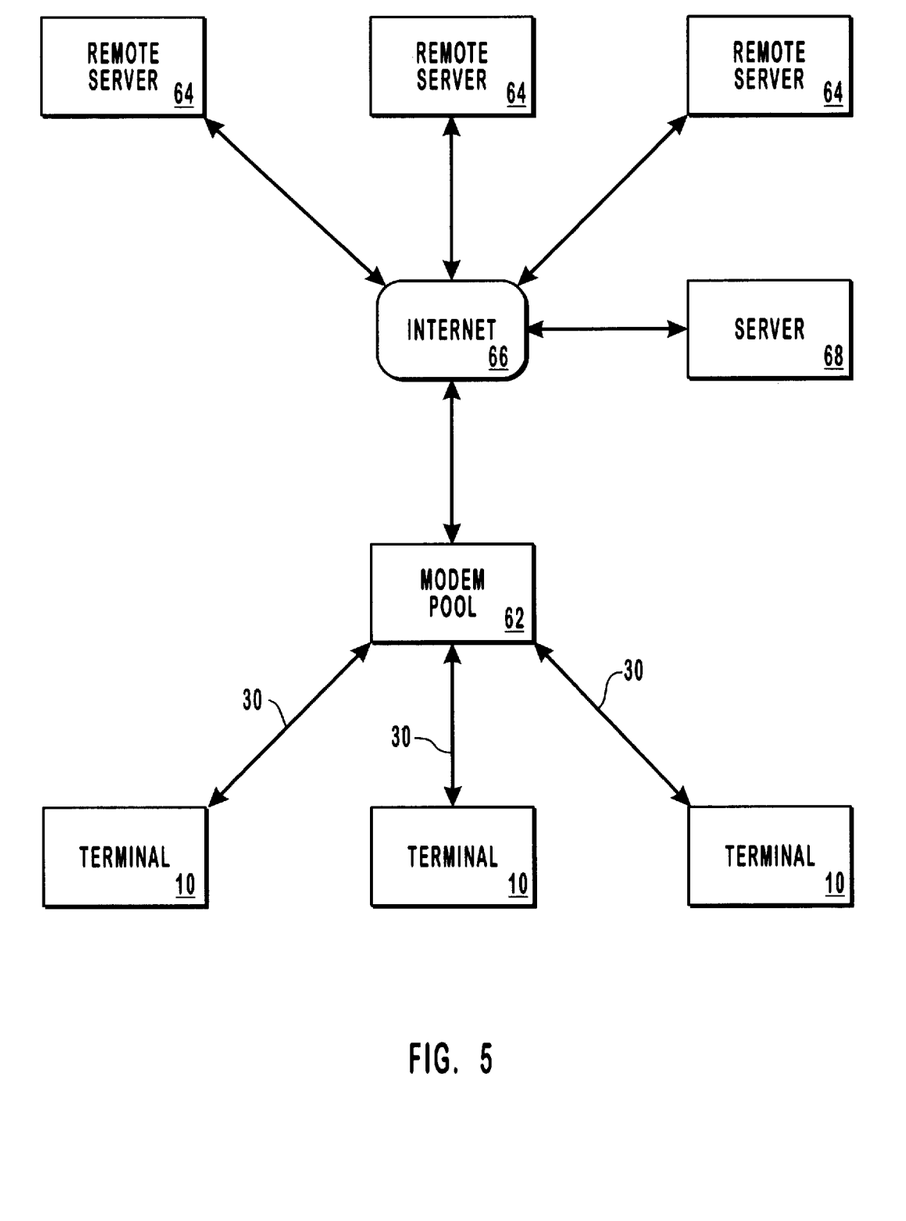
FIG. 5 is a schematic view of an Internet system network in which the terminal of FIG. 1 operates.

FIG. 5 illustrates a basic configuration of the Internet system network in which the terminal operates. A number of terminals 10 are coupled to a modem pool 62 via direct-dial, bi-directional data connections 30, which may be telephone connections, ISDN connections, or any other similar type of connection, such as cable and satellite forward channels. In any event, modem pool 62 is coupled typically through a router, such as that conventionally known in the art, to a number of remote servers 64 via a conventional network infrastructure, such as the Internet 66. The Internet system also includes a WEBTV network server 68, which specifically supports terminals 10. The terminals each have a connection to server 68 through modem pool 62 and the Internet. Note that modem pool 62 is a conventional modem pool, such as those found today throughout the world providing access to the Internet and private networks.

As described above, information relating to Internet browsing or television viewing is displayed as part of the user interface. The television home and Internet home configurations depicted in FIGS. 2 and 3 are the basic starting points for accessing television- and Internet-related services or configurations within each mode. These home pages are similar in concept to the home pages utilized on the world-wide-web, and extending this concept to the television mode brings consistency to the user interface, thereby increasing user comfort and ease of use. Each home configuration includes elements or user interface buttons which allow a user to select various other configurations or to switch modes. The television or Internet mode configurations are "television" or "Internet" configurations in that they are accessible while the user interface is within the corresponding television or Internet mode. Thus, the user interface presented in each television or Internet configuration offers features or functions related to television viewing or Internet browsing, respectively.

Figure 7:
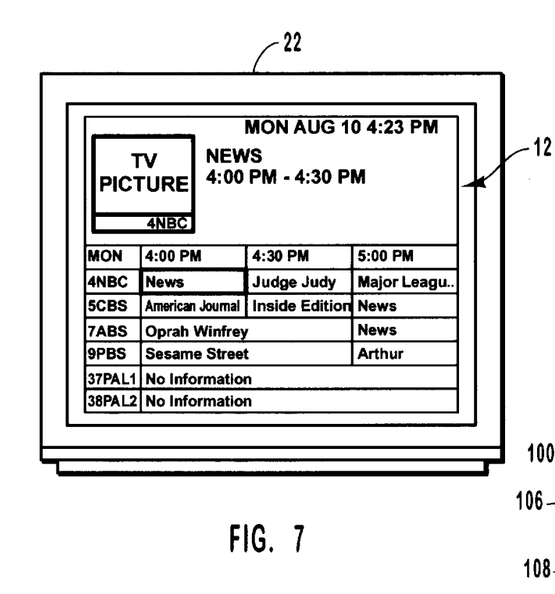
FIG. 7 shows the user interface in a programming guide configuration of the television viewing mode.

With reference to FIG. 2, the television home configuration of the television mode includes a "Web Home" button 80 to switch to the Internet mode, a "Settings" button 82 to access a control configuration where various features of the interface and system configuration can be set, a "TV Listing" button 84 to transfer to a television programming guide configuration, as shown in FIG. 7, a "How to" button 86 to provide help to the user.

A pop-up button bar 89 is located at the bottom of the screen in TV Home configuration and is selectively displayable by pushing the options button on remote 24. The pop-up button bar includes buttons to access four television configurations: a "TV Favorites" button 94 for accessing a TV Favorites configuration in which multiple static television windows representing snapshots of the content of different channels are displayed, with one window showing an active channel; a "TV Planner" button 95 for accessing a TV Planner configuration which allows a user to plan a television viewing schedule; a "VCR" button 96 to access a VCR setup configuration which allows a user to program the operation of a video cassette recorder; and a "TV Sites" button 97 to access a TV Sites configuration which presents a user with web sites that are related to various television programs. The central area of user interface 12 is occupied by a television window 88 in which television programming, i.e., a television program or show, commercial, etc, is displayed. Another television mode configuration is a full-screen television configuration in which the television program displays on the entire television screen. It can thus be seen that the TV Home configuration organizes access to the various television mode configurations in much the same way that a world wide web home page organizes material available at a web site. By extending the world wide web model to television viewing, a user is presented with an interface that is consistent between Internet browsing and television viewing and thus more easily understood and navigated.

The Internet home configuration of the Internet mode, as shown in FIG. 3, includes a "TV Home" button 90 to switch to the television mode, a "Using WEBTV" button 92 to provide help to the user, a "Mail" button 94 to allow a user to access a mail configuration in which email can be sent and read, as well as various other buttons. Note that the Internet mode may selectively have displayed thereon a small television window 98 displaying television programming for the current channel during Internet browsing.

Figure 6:
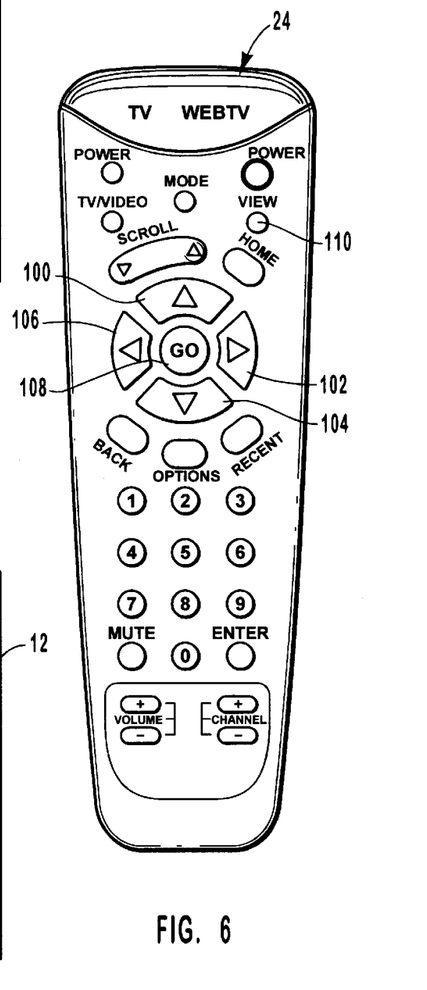
FIG. 6 shows a remote control for use with the terminal of FIG. 1.

As shown in FIG. 6, remote control 24 includes various user operable buttons that allow a user to control the operation of the terminal and switch between modes and configurations. Arrow buttons 100–106 allow a user to navigate among the various buttons on the screen to select a particular option. Once the desired interface button is selected, "GO" button 108 is used to signal the terminal to execute the currently selected user interface button.

Of particular interest to the present invention is "View" button 110 which allows the user to toggle, or switch, back and forth between the Internet and television modes. The terminal is configured to maintain the current state— connection status, active web page, history, etc.—of the Internet mode when a transition to television mode occurs. This allows a user to switch back and forth between modes without having to start the browsing process over each time. Thus, when a user switches back to the Internet mode, they are placed in the same configuration and state as when they left.

If the transition to television viewing lasts longer than a predetermined time, for instance 5, 10 or 30 minutes, the terminal is configured to time out and drop the telephone connection to reduce inactive telephone line usage. Upon toggling back to the Internet mode after the telephone connection is dropped, the connection is automatically reestablished and the preexisting state restored. This allows the user to continue browsing as if no interruption had occurred. If the television mode transition lasts longer than a time-out period, for instance one, two or three hours, the state information is discarded and the next transition to the Internet mode brings the user to the Internet home page, rather than back to the web-page last viewed.

In the television mode, certain configurations, defined as auxiliary configurations, such as the settings configuration (not shown), do not show an active television program. Other configurations, defined as viewing configurations, do show an active television program. Some configurations may fall into either category. For instance, the programming guide configuration, shown in FIG. 7, includes a window 120 in which television programs may be, but are not always, displayed. When the currently selected channel and time, as indicated by the highlighted border and controlled using the arrow keys on the remote, is for a program that has not yet started, no television program is displayed. If, however, the current selection is a show that is under way, the program is displayed in window 120.

When the view button is used to toggle from a television mode configuration in which no television programming is displayed to the Internet mode, and the view button is used again to toggle back to the television mode, the television mode will not be in the same configuration. Rather, the configuration of the user interface will be changed to a television viewing configuration, such as the TV home or full screen configuration. This is done because the user may have been browsing for some time and not remember the configuration of the television mode when browsing started. In addition, another user, such as a family member, may make the transition back to television viewing. In either case, a user may become confused if they are attempting to switch to television viewing and encounter a user interface in which no television programming is displayed. To overcome this difficulty, the control system/electronics unit monitors or checks the last configuration of the television mode and, if necessary, changes the configuration to a configuration in which a television program is displayed, such as the full screen or TV home configurations. If the last television configuration was the full screen or TV home configuration, the configuration remains unchanged upon return. However, if the last television configuration was an auxiliary configuration, the configuration will be switched to the TV home configuration upon return. It should be noted that a user can switch to the full screen configuration by pushing the "Go" button on the remote with the television window highlighted in the TV Home configuration and can return to the TV Home configuration by pressing the "Home" button on the remote.

Figure 8:
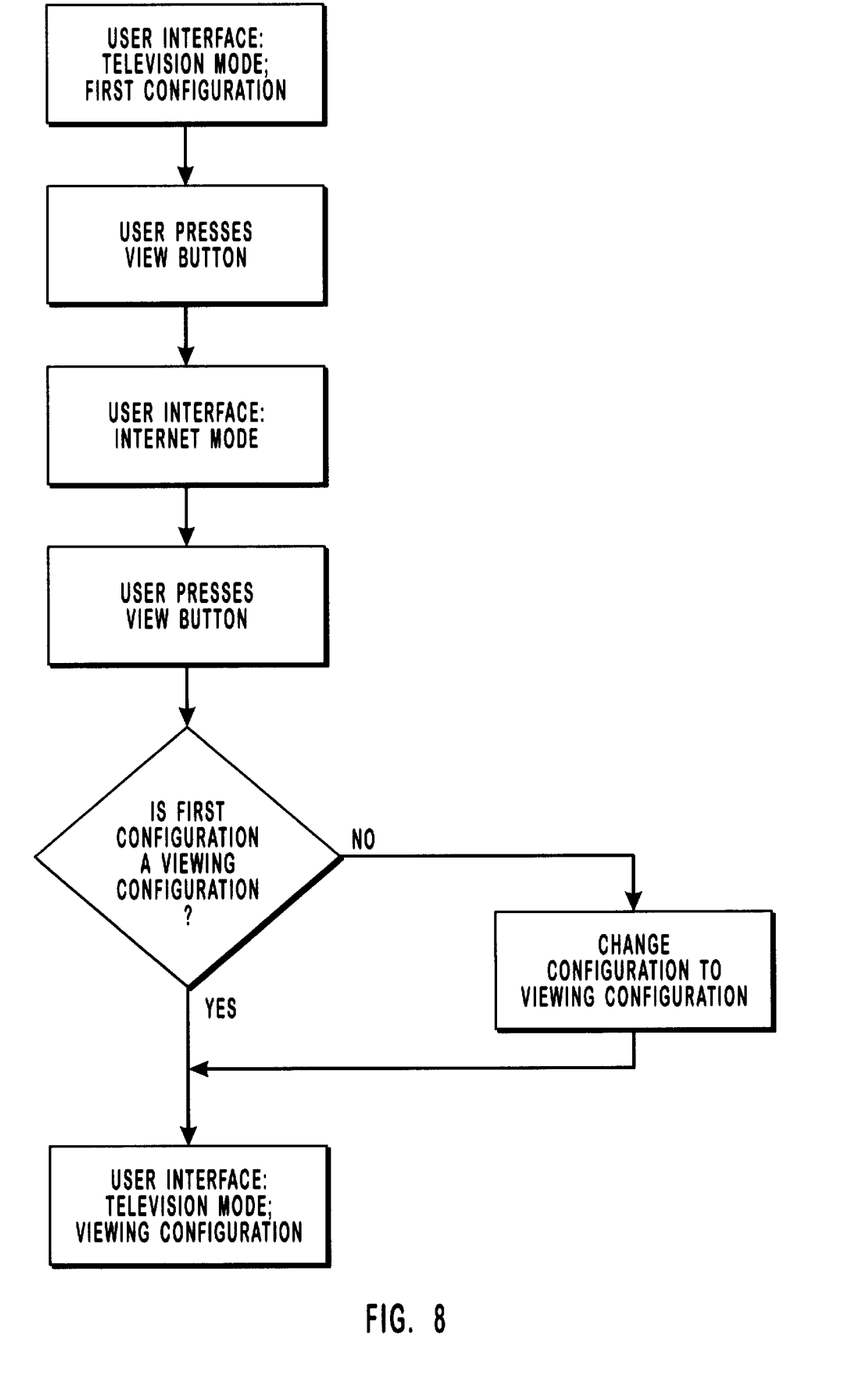
FIG. 8 shows the logic of user interface mode toggling according to the present invention.

The basic operation of the present system is depicted in FIG. 8. Starting with the user interface display in the television mode in a first configuration, the interface is toggled to the Internet mode. The user interface is then toggled back to the television mode, and in the process of the transition the first configuration is checked. If the first configuration is a viewing configuration, then the configuration is not changed and configuration of the television mode is not changed. If, on the other hand, the first configuration is not a viewing configuration, then the configuration of the television mode is changed to a viewing configuration prior to display of the television mode.

Figure 9:
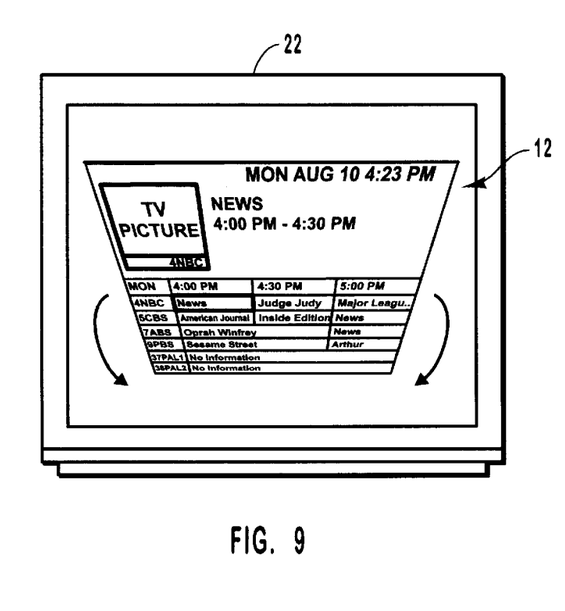
FIG. 9 illustrates the appearance of the user interface of FIG. 2 during transition between modes.

FIG. 9 shows the appearance of the user interface during the actual transition between modes. In particular, the user interface appears to rotate or flip and display the new mode on the backside of the user interface of the prior mode. When television window 98 is active in the Web mode, the sound and television picture are continuous throughout the flip between modes. Thus, as the user interface begins to rotate, the television image continues to be updated and rotates with the rest of the user interface. As a result, the transition occurs without any jarring video or audio discontinuities.

Although the present invention has been described in terms of the WEBTV Internet access terminal, it should be understood that the invention is also applicable to use with other computer systems. For instance, the present invention can be implemented in a general purpose computer or other special purpose Internet access terminals.

While the invention has been disclosed in its preferred form, the specific embodiments thereof as disclosed and illustrated herein are not to be considered in a limiting sense as numerous variations are possible. Applicants regard the subject matter of their invention to include all novel and non-obvious combinations and subcombinations of the various elements, features, functions and/or properties disclosed herein. No single feature, function, element or property of the disclosed embodiments is essential. The following claims define certain combinations and subcombinations which are regarded as novel and non-obvious. Other combinations and subcombinations of features, functions, elements and/or properties may be claimed through amendment of the present claims or presentation of new claims in this or a related application. Such claims, whether they are broader, narrower or equal in scope to the original claims, are also regarded as included within the subject matter of applicants' invention.

What is claimed is:

1. In an Internet access terminal that enables television viewing and Internet browsing on a display device, a method of toggling a user interface of the Internet access terminal between an Internet mode and a television mode such that user understanding of the browsing and viewing experience is enhanced and such that inactive telephone line usage is reduced, the method comprising the acts of:

receiving a first user input requesting a toggle of the user interface from television mode to Internet mode, the first user input being received while the user interface is in the television mode and is further in an auxiliary configuration in the television mode as opposed to being in a viewing configuration in the television mode, wherein the auxiliary configuration does not display an active television program on the display device;

in response to the first user input, toggling the user interface from the television mode to the Internet mode in which the Internet access terminal communicates using a telephone connection;

receiving a second user input requesting a toggle of the user interface to the television mode;

determining that the user interface had been in the auxiliary configuration in the television mode when the first user input was received;

in response to the second user input and based on the act for determining, toggling the user interface from the Internet mode to the viewing configuration in the television mode in which an active television program is displayed on the display device, as opposed to toggling the user input to the auxiliary configuration in the television mode;

saving state information specifying a previous state in which the Internet access terminal operated when the second user input was received;

while the user interface is in the television mode, monitoring the time that has elapsed since the user interface was toggled from the Internet mode to the television mode to determine whether a first predetermined period of time elapses prior to receiving a third user input requesting a toggle of the user interface to the Internet mode and also to determine whether a longer, second predetermined period of time elapses prior to receiving said third user input;

if the first predetermined period of time elapses prior to receiving said third user input, dropping the telephone connection, otherwise, maintaining the telephone connection;

if the second predetermined period of time elapses prior to receiving said third user input, discarding the stored state information, otherwise, continuing to store the state information;

receiving the third input;

in response to receiving the third user input, again toggling the user interface from the television mode to the Internet mode and:

if the first predetermined period of time and the second predetermined period of time have not elapsed, resuming communication using the telephone connection;

if the first predetermined period of time has elapsed and the second predetermined period of time has not elapsed, automatically reestablishing the telephone connection, and restoring the previous state of the Internet access terminal based on the state information; and if both the first and second predetermined periods of time have elapsed, automatically reestablishing the telephone connection and causing the Internet access terminal to operate in a default state as opposed to restoring the previous state.

2. A method as recited in claim 1, wherein the default state is a state in which a default page is accessed by the Internet access terminal and displayed on a display device associated with the Internet access terminal.

3. A method as recited in claim 1, wherein the previous state is a state in which a page selected by the user is displayed on a display device associated with the Internet access terminal.

4. A method as recited in claim 3, wherein the previous state is further a state in which a history of the Internet access terminal is maintained, such that restoring the previous state causes the history of the Internet access terminal to be maintained.

5. In an Internet access terminal that enables television viewing and Internet browsing on a display device, a method of toggling a user interface of the Internet access terminal between an Internet mode and a television mode so as to reduce inactive telephone line usage while assisting a user of the Internet access terminal to access the Internet after a period of inactivity, the method comprising the acts of:

receiving a first user input requesting a toggle of the user interface from Internet mode to television mode, wherein the Internet access terminal communicates using a telephone connection when the user interface is in the Internet mode;

in response to the first user input, toggling the user interface from the Internet mode to the television mode and saving state information specifying a previous state in which the Internet access terminal operated when the first user input was received;

while the user interface is in the television mode, monitoring the time that has elapsed since the user interface was toggled from the Internet mode to the television mode to determine whether a first predetermined period of time elapses prior to receiving a second user input requesting a toggle of the user interface to the Internet mode and also to determine whether a longer, second predetermined period of time elapses prior to receiving said second user input;

if the first predetermined period of time elapses prior to receiving said second user input, dropping the telephone connection, otherwise, maintaining the telephone connection;

if the second predetermined period of time elapses prior to receiving said second user input, discarding the stored state information, otherwise, continuing to store the state information;

receiving said second user input;

in response to receiving said second user input, toggling the user interface from the television mode to Internet mode and:
  if the first predetermined period of time and the second predetermined period of time have not elapsed, resuming communication using the telephone connection;
  if the first predetermined period of time has elapsed and the second predetermined period of time has not elapsed, automatically reestablishing the telephone connection, and restoring the previous state of the Internet access terminal based on the state information; and
  if both the first and second predetermined periods of time have elapsed, automatically reestablishing the telephone connection and causing the Internet access terminal to operate in a default state as opposed to restoring the previous state.

6. A method as recited in claim 5, wherein the default state is a state in which a default page is accessed by the Internet access terminal and displayed on a display device associated with the Internet access terminal.

7. A method as recited in claim 5, wherein the previous state is a state in which a page selected by the user is displayed on a display device associated with the Internet access terminal.

8. A method as recited in claim 7, wherein the previous state is further a state in which a history of the Internet access terminal is maintained, such that restoring the previous state causes the history of the Internet access terminal to be maintained.

9. A computer program product for implementing, in an Internet access terminal that enables television viewing and Internet browsing on a display device, a method of toggling a user interface of the Internet access terminal between an Internet mode and a television mode so as to reduce inactive telephone line usage while assisting a user of the Internet access terminal to access the Internet after a period of inactivity, the computer program product comprising:
  a computer-readable medium carrying computer-executable instructions that, when executed by the Internet access terminal, cause the Internet access terminal to implement the method, including the acts of:
    receiving a first user input requesting a toggle of the user interface from Internet mode to television mode, wherein the Internet access terminal communicates using a telephone connection when the user interface is in the Internet mode;
    in response to the first user input, toggling the user interface from the Internet mode to the television mode and saving state information specifying a previous state in which the Internet access terminal operated when the first user input was received;
    while the user interface is in the television mode, monitoring the time that has elapsed since the user interface was toggled from the Internet mode to the television mode to determine whether a first predetermined period of time elapses prior to receiving a second user input requesting a toggle of the user interface to the Internet mode and also to determine whether a longer, second predetermined period of time elapses prior to receiving said second user input;
    if the first predetermined period of time elapses prior to receiving said second user input, dropping the telephone connection, otherwise, maintaining the telephone connection;
    if the second predetermined period of time elapses prior to receiving said second user input, discarding the stored state information, otherwise, continuing to store the state information;
    receiving said second user input;
    in response to receiving said second user input, toggling the user interface from the television mode to the Internet mode and:
      if the first predetermined period of time and the second predetermined period of time have not elapsed, resuming communication using the telephone connection;
      if the first predetermined period of time has elapsed and the second predetermined period of time has not elapsed, automatically reestablishing the telephone connection, and restoring the previous state of the Internet access terminal based on the state information; and
      if both the first and second predetermined periods of time have elapsed, automatically reestablishing the telephone connection and causing the Internet access terminal to operate in a default state as opposed to restoring the previous state.

* * * * *